United States Patent [19]

Burkett et al.

[11] 4,144,167

[45] Mar. 13, 1979

[54] SEWAGE TREATMENT SYSTEM

[76] Inventors: Albert L. Burkett, 3700 E. Bellevue No. 313, Tucson, Ariz. 85716; Albert O. Nelson, P.O. Box 248, Tucson, Ariz. 85702

[21] Appl. No.: 787,567

[22] Filed: Apr. 14, 1977

[51] Int. Cl.² .................. B01D 35/00; B02C 23/38
[52] U.S. Cl. .................. 210/104; 210/136; 210/152; 210/173; 210/210; 210/219; 210/416 L; 241/46.17; 241/154
[58] Field of Search ........ 210/152, 173, 174, 209–215, 210/219, 416 R, 416 L, 104, 136; 241/46.17, 154, 161, 162, 188 R, 300; 417/129, 138, 149

[56] References Cited

U.S. PATENT DOCUMENTS

| | | | |
|---|---|---|---|
| 1,932,037 | 10/1933 | Gylstrom | 417/129 X |
| 2,300,039 | 10/1942 | Yeomans et al. | 417/138 X |
| 2,695,755 | 11/1954 | Denovan et al. | 241/154 X |
| 2,894,697 | 7/1959 | Panning et al. | 241/154 |
| 3,049,489 | 8/1962 | Ciabattari | 417/138 X |
| 3,065,919 | 11/1962 | Burkett et al. | 241/161 |
| 3,160,354 | 12/1964 | Burkett | 241/300 X |
| 3,375,776 | 4/1968 | Dyson | 241/46.17 X |
| 3,772,188 | 11/1973 | Edwards | 210/173 X |
| 3,987,970 | 10/1976 | Burkett | 241/154 X |

*Primary Examiner*—Robert H. Spitzer
*Attorney, Agent, or Firm*—Herbert E. Haynes, Jr.

[57] ABSTRACT

A system including an evacuator apparatus, an especially configured centrifugal mill, and a self cleaning screen is employed for treatment of aqueous sewage. The system expedites satisfaction of the biochemical oxygen demand and separates the solids from the sewage so that the treated water is suitable for uses such as irrigation, equipment cooling and the like, and the separated solids are suitable for use in fertilizers.

13 Claims, 8 Drawing Figures

SEWAGE TREATMENT SYSTEM

BACKGROUND OF THE INVENTION

1. Field of the Invention

This invention relates to sewage treatment and more particularly to a system for the treatment of aqueous raw sewage.

2. Description of the Prior Art

In most municipalities, raw sewage is collected in a complex network of sewer pipes and transported through those pipes to sewage treatment plants. Odor problems and other environmental considerations have dictated that those sewage treatment plants be ideally located in areas remote from the municipalities that they serve. The treatment plants themselves generally include a complex installation of digesting tanks, chemical treatment facilities and other equipment for processing the raw sewage to render it suitable for either disposal into rivers or other waterways, or for reuse such as for crop irrigation, equipment cooling and the like.

Due to the high costs of construction, land, and operation, many municipalities are hard pressed to provide adequate facilities for increasing populations and the decentralized suburban settlements springing up around existing municipalities.

In addition to those problems, disposal of treatment plant by-products has caused environmental problems when disposal thereof is accomplished by dumping into waterways.

Many areas of the country could put the water reclaimed by sewage treatment plants to good use in multiple areas of relatively low volume usage. However, due to the costs for building a distribution system it is not economically feasible to transport the reclaimed water to locations other than points of high volume usage such as large irrigated farms, power generating plants and the like.

Therefore, the need exists for a new and useful sewage treatment system which overcomes some of the problems and shortcomings of the prior art.

SUMMARY OF THE INVENTION

In accordance with the present invention, a new and useful sewage treatment system is disclosed for the treatment of raw aqueous sewage to reclaim the water by rendering it suitable for non-drinking usages and for separating the solids therefrom for usage in fertilizers.

The sewage treatment system of the present invention includes an evacuator means for extracting raw aqueous sewage from sewer pipes, or other sources, and supplying the extracted sewage to an especially configured centrifugal mill. The centrifugal mill applies high speed mechanical forces to the incoming aqueous sewage for disintegration of the solids and thorough aeration of the liquids thereof. The flow rate of the incoming aqueous sewage through the centrifugal mill is maintained at a rate which assures that the mill's rotors are not required to operate under an aqueous medium and air is admitted to the mill in sufficient amounts to insure complete aeration. In this manner, the drive equipment size and power consumption are held to a minimum and relatively high rotor speeds are attainable to cause introduction of large quantities of air which satisfies the biochemical oxygen demand of the aqueous sewage and produce odor free by-products.

The odor free by-products emerge tangentially from the centrifugal mill and is fed through a self cleaning screen means which separates the disintegrated or pulpy solids and delivers reclaimed water.

The odor free by-products of the system of the present invention and the very design of the system itself allows a municipality to employ this system with economic and conservation advantages resulting therefrom. By way of explanation, the rapid treatment of the raw sewage and the odor free by-products thereof allows such systems to be installed virtually anywhere. Installation of these relatively small compact systems at various locations in and about a municipality will allow the expansion of the muncipality's sewage treatment facilities to progress on an as needed basis with minimum expenditures. Further, the problem of distribution of the reclaimed water for non-drinking uses is substantially reduced in that the water can be more economically distributed about a multiplicity of variously located relatively low volume sources rather than from a single remote high volume source.

Accordingly, it is an object of the present invention to provide a new and useful system for treatment of aqueous raw sewage.

Another object of the present invention is to provide a new and useful system for treatment of aqueous raw sewage with the system being of minimum complexity, size, and power consumption.

Another object of the present invention is to provide a new and useful system which rapidly aerates raw sewage to satisfy the biochemical oxygen demand thereof.

Another object of the present invention is to provide a new and useful system which rapidly aerates and separates the solids from aqueous raw sewage to produce odor free by-products of the system.

Still another object of the present invention is to provide a new and useful system for rapid deodorization of aqueous raw sewage and separation thereof into reclaimed water suitable for non-drinking usages and solids for use in fertilizers.

Yet another object of the present invention is to provide a new and useful system of the above described character which includes evacuator means for supplying aqueous raw sewage from a source to a centrifugal mill which disintegrates and aerates the aqueous raw sewage which is then fed to a self cleaning screen means which separates the solids from the water for subsequent reuse of those system by-products.

The foregoing and other objects of the present invention, as well as the invention itself, may be more fully understood from the following description when read in conjunction with the accompanying drawings.

DESCRIPTION OF THE PREFERRED EMBODIMENT

Figure 1:
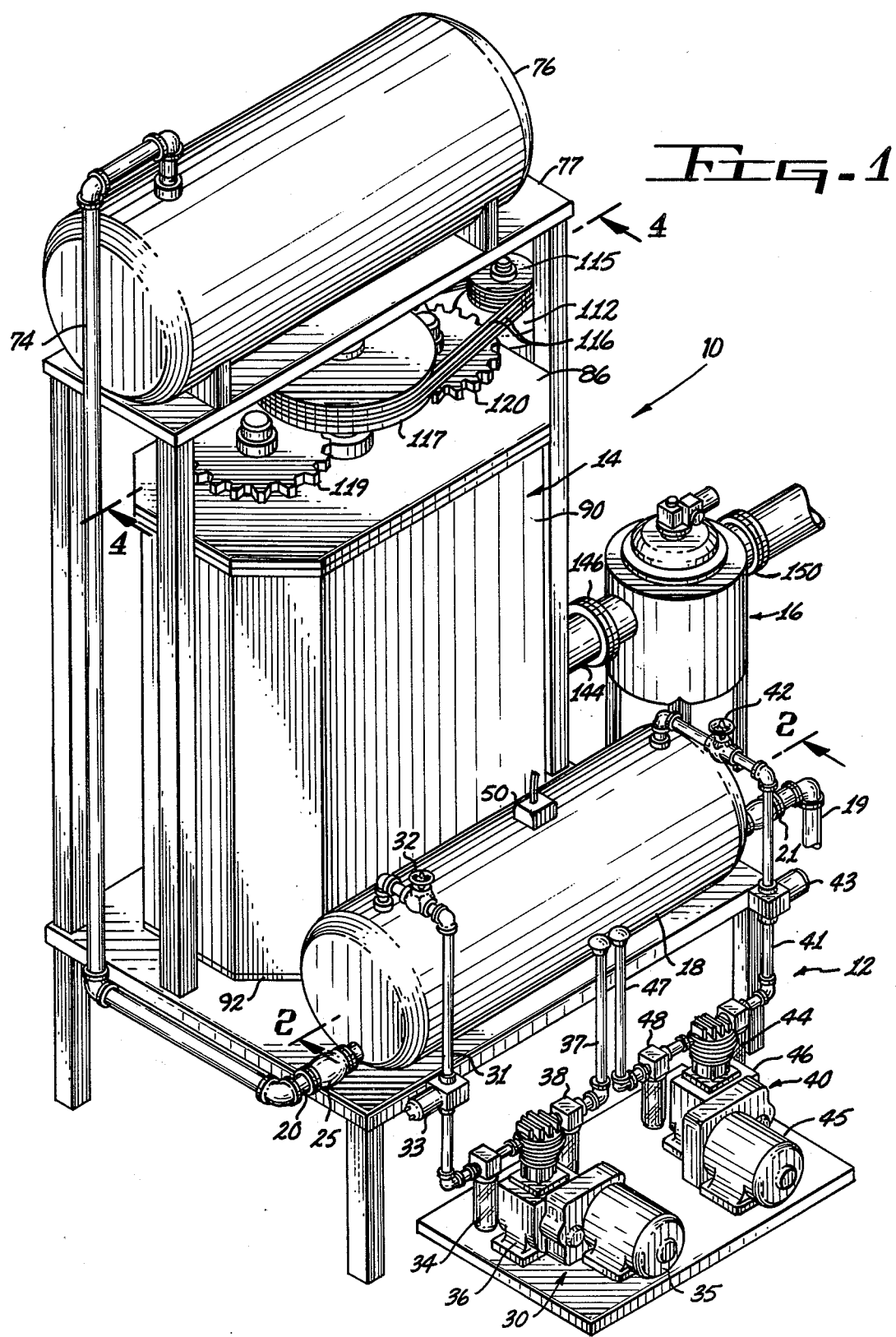
FIG. 1 is an isometric view of the sewage treatment system of the present invention illustrating the various features thereof.

Referring more particularly to the drawings, FIG. 1 illustrates the sewage treatment system of the present invention which is indicated generally by the reference numeral 10.

As shown and as will hereinafter be described in detail, the sewage treatment system 10 comprises an evacuator means 12 for extracting raw aqueous sewage from a sewer line (not shown) or other source, and delivering the sewage to an especially configured centrifugal mill 14. The sewage is disintegrated and aerated in the centrifugal mill 14 and is directed therefrom through a self cleaning screen means 16 which separates the pulpy solids from the aqueous portions of the sewage.

The evacuator means 12, as shown in FIGS. 1 through 4, includes an evacuator tank 18 having a raw sewage inlet line 19 connected to one side thereof and a raw sewage outlet line 20 connected to the opposite side. The sewage inlet line 19 is suitably connected to a source (not shown) of raw aqueous sewage such as the trunk line of a sewage system. Sewage moving through the inlet line 19 passes through a check valve 21 which may be of any suitable well known type which allows flow in the direction of arrow 22 (FIG. 2) and checks any attempts of reverse flow. The inlet check valve 21 is shown as including a housing 23 of the in-line type having a hingedly mounted flapper 24 therein. Sewage existing from the evacuator tank 18 through the outlet line 20 passes through an outlet check valve 25 which as above may include an in-line housing 26 having a hinged flapper 27 therein and which is adapted to allow flow in the direction of arrow 28 (FIG. 2) and check flow in the reverse direction.

Aqeuous raw sewage is caused to flow through the inlet line 19 from the source (not shown) to the evacuator tank 18 by actuation of a vacuum or suction pump 30 which pulls a vacuum within the tank 18. As shown in FIG. 1, a vacuum line 31 is suitably coupled between the evacuation tank 18 and the suction pump 30, with that vacuum line having a manual shutoff valve 32, an electrically operated solonoid valve 33 and a filter 34 therein. The manual shutoff valve 32, of course, allows manual closing of the vacuum line 31, the solonoid valve 33 is part of an automatic evacuator means control system which will hereinafter be described, and the filter 34 protects the suction pump 30 from the highly corrosive action of the sewage fumes and also prevents venting of those fumes to ambient. The suction pump 30 may be of any well known type and is shown as having an electric motor 35 operatively coupled to drive the pump portion 36. The exhaust line 37 from the pump 36 has a filter 38 therein, for trapping any fumes which may have escaped trapping within the other filter 34.

Aqueous raw sewage is caused to flow out of the evacuator tank 18 through the outlet line 20 by actuation of a pressure pump 40 which supplies compressed air to the interior of the evacuator tank 18. As shown in FIG. 1, a pressure line 41 is suitably coupled between the evacuator tank 18 and the pressure pump 40, with that pressure line having a manual shutoff valve 42, an electrically operated solonoid valve 43 and a filter 44 therein. The manual shutoff valve 42 permits manual closing of the pressure line 41, the solonoid valve 43 is part of the automatic control system to be described, and the filter 44 protects the pump by trapping sewage fumes. As with the previously described suction pump 30, the pressure pump 40 may be of any well known type and is shown as including an electric motor 45 operatively coupled to drive a compressor 46. The inlet line 47 of the compressor 46 has a suitable filter 48 therein.

Figure 2:
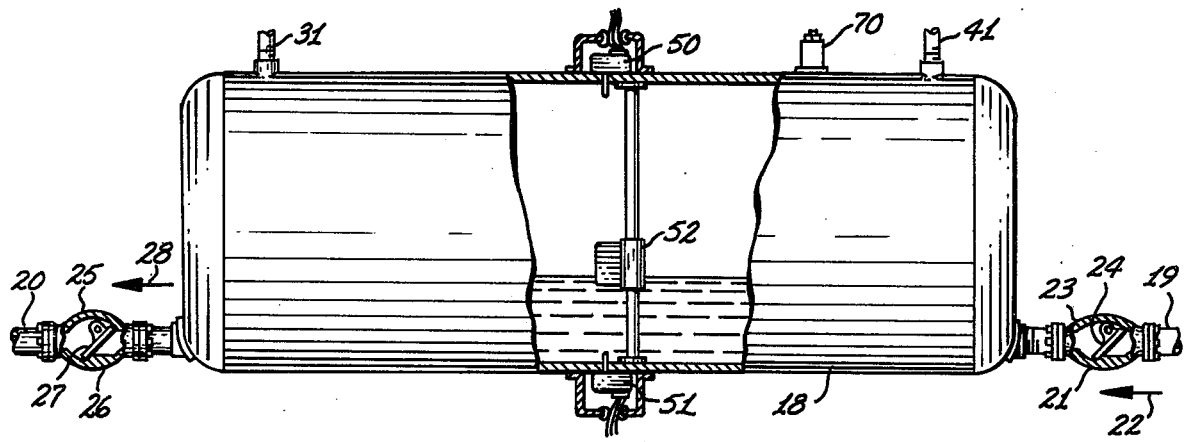
FIG. 2 is an enlarged fragmentary sectional view taken on the line 2—2 of FIG. 1.

As shown in FIG. 2 the evacuator tank 18 is provided with a first limit switch 50 mounted on top of the tank 18 for indicating when the tank is full, and a second limit switch 51 which is mounted on the bottom of the tank 18 and is used to indicate a tank empty state. A suitable float mechanism 52 is provided within the evacuator tank for contacting the first limit switch 50 when the tank is full and contacting the second limit switch 51 when the tank is nearly empty. It should be understood that the above described float system is merely one way of indicating the full and empty states of the evacuator tank 18 as other means could be employed such as a well known type of electrode system (not shown).

Figure 3:
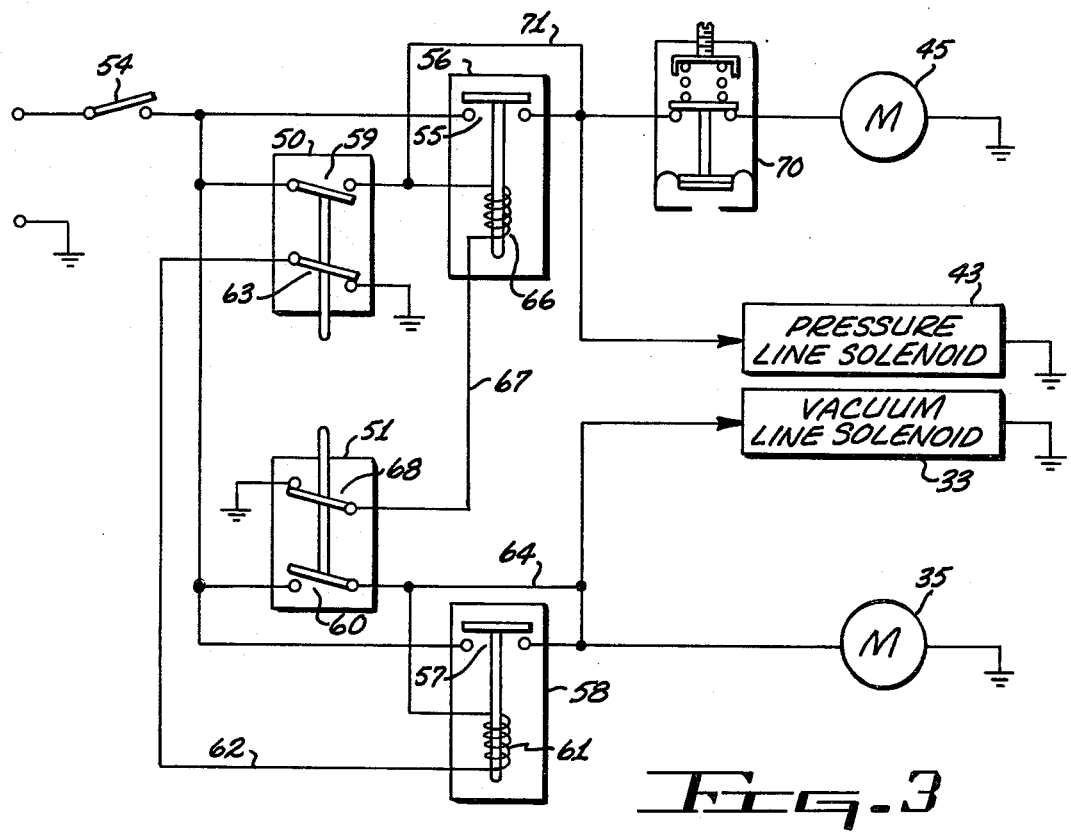
FIG. 3 is a schematic wiring diagram of the evacuator means portion of the system of the present invention.
Figure 4:
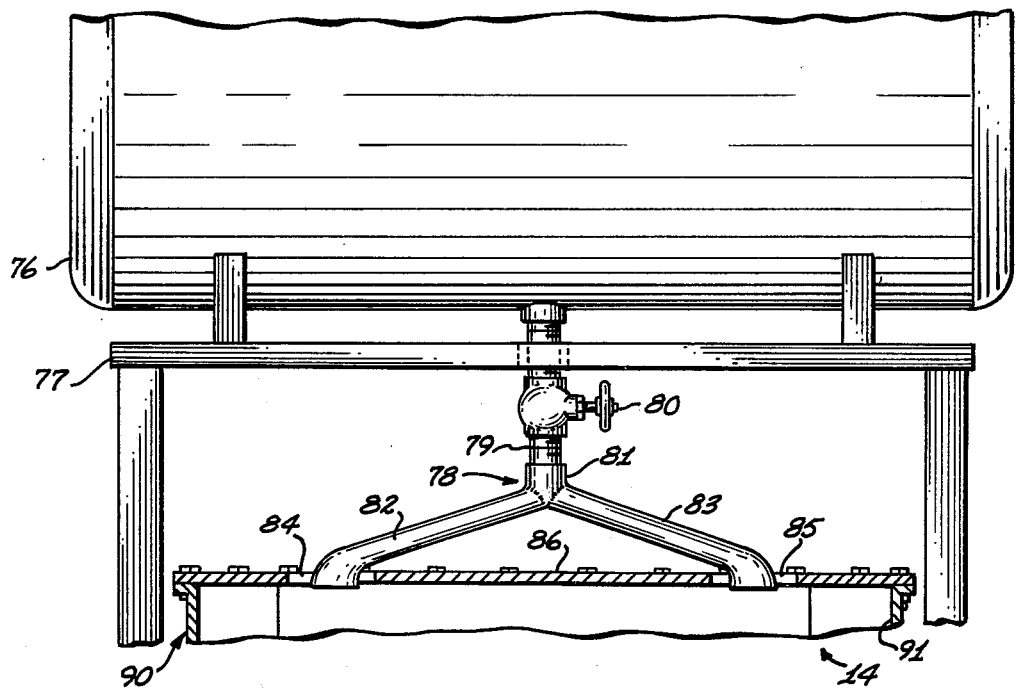
FIG. 4 is an enlarged fragmentary sectional view taken on the line 4—4 of FIG. 1.

Referring now to FIG. 3 which shows a schematic wiring diagram of one means for automatically controlling the operation of the evacuator means 12. The electric circuit includes a manually operable off-on switch 54 which, when closed, simultaneously applies A.C. to: the normally open contacts 55 of a latching relay 56, the normally open contacts 57 of a latching relay 58, the normally open contacts 59 of the first limit switch 50, and the normally open contacts 60 of the second limit switch 51. When the float 52 within the evacuator tank 18 (FIG. 2) contacts the second limit switch 51 caused by an empty state of the tank 18, the switch 51 is activated to close the normally open contacts 60 thereof which applies A.C. to the coil 61 of the latching relay 58, the circuit of which is completed by the line 62 which connects the coil 61 through normally closed contacts 63 of the first limit switch 50 to ground. Current passing through the coil 61 closes the normally open contacts 57 of the latching relay 58 which applies A.C. to the motor 35 of the vacuum pump 30 (FIG. 1) and to the normally closed vacuum line solonoid 33 causing it to open. This same closing of the contacts 57 of the latching relay 58 causes an A.C. to pass through a feedback line 64 which provides the latching function of the relay 58 by maintaining the completed state of the circuit through the coil 61 regardless of the state of the contacts 60 of the second limit switch 51 which will return to the normally open state when the float 52 begins to rise as a result of the inflow of aqueous sewage into the evacuator tank 18.

With the vacuum pump 30 energized and the vacuum line solonoid 33 open as described above, aqueous sewage will be drawn into the evacuator tank 18 as a result of the vacuum drawn therein, and this inflow will continue until the float 52 comes into contact with the first limit switch 50. When the float 52 activates the first limit switch 50 the normally closed contacts 63 thereof, will be opened which opens the ground circuit of the coil 61 of the latching relay 58 thus removing A.C. from the motor 35 of the vacuum pump 30 and from the vacuum line solonoid 33. Activation of the first limit switch 50 as described above will also close the normally open contacts 59 thereof which applies A.C. to the coil 66 of the latching relay 56, the circuit of which is completed by the line 67 which connects the coil 66 through normally closed contacts 68 of the second limit switch 51 to ground. Current passing through the coil 66 causes the normally open contacts 55 of the latching relay 56 to close which applies A.C. through a normally closed pressure responsive switch 70 to the motor 45 of the pressure pump 40 (FIG. 1) and to the normally closed vacuum line solenoid 43 causing it to open. Closing of the latching relay 56 also causes A.C. to pass through a feedback line 71 which provides the latching function of the relay 56 by maintaining the completed state of the circuit of the coil 66 regardless of the reopening of the contacts 59 when the float 52 begins to fall as a result of the outflow of the aqueous sewage from the evacuator tank 18. The previously mentioned pressure responsive switch 70 is mounted on the evacuator tank 18 and is sensitive to the internal pressure of the tank. The pressure sensitive switch 70 is adjustable and may be set to open the circuit to the motor 45 of the pressure pump 40 in the event that the tank 18 becomes over pressurized.

It may now be seen that when the evacuator tank 18 is nearing empty, the vacuum pump 30 will be actuated to fill the tank with aqueous sewage, and when the tank is nearly full, the vacuum pump 30 is shut off and the pressure pump 40 will be actuated, and those functions will automatically be accomplished.

It should be obvious that the above described functions of filling and emptying the evacuator tank 18 could be accomplished in various other ways such as by employing an in-line pump system (not shown). However, it is preferred that the above described evacuator means 12 be employed in that the aqueous sewage is kept away, as much as possible, from mechanisms which would otherwise be damaged by the highly corrosive action of the aqueous sewage.

When the evacuator tank 18 is pressurized as described above, aqueous sewage will exit from the evacuator tank 18 through the outlet check valve 25 mounted in the outlet line 20 and move through a transfer pipe 74 and is deposited into a holding tank 76, all of which is seen in FIG. 1. The holding tank 76 is suitably mounted above the centrifugal mill 14, such as on a platform 77, and as seen best in FIG. 4, has a distribution manifold 78 leading from the bottom of the tank 76 to the mill 14 as will hereinafter be described. The distribution manifold 78 has a main or trunk line 79 suitably affixed to the holding tank 76 so as to be in communication with the interior thereof. The trunk line 79 is provided with a manually operated valve 80 therein for controlling the flow rate of the aqueous sewage through the manifold into the centrifugal mill 14. The lower end of the trunk line 79 has a flow divider pipe assembly 81 connected thereto, with the divider pipe including a pair of angularly diverging lines 82 and 83 which divide and direct the aqueous sewage into spaced inlet openings 84 and 85 provided in the top 86 of the mill 14.

Figure 5:
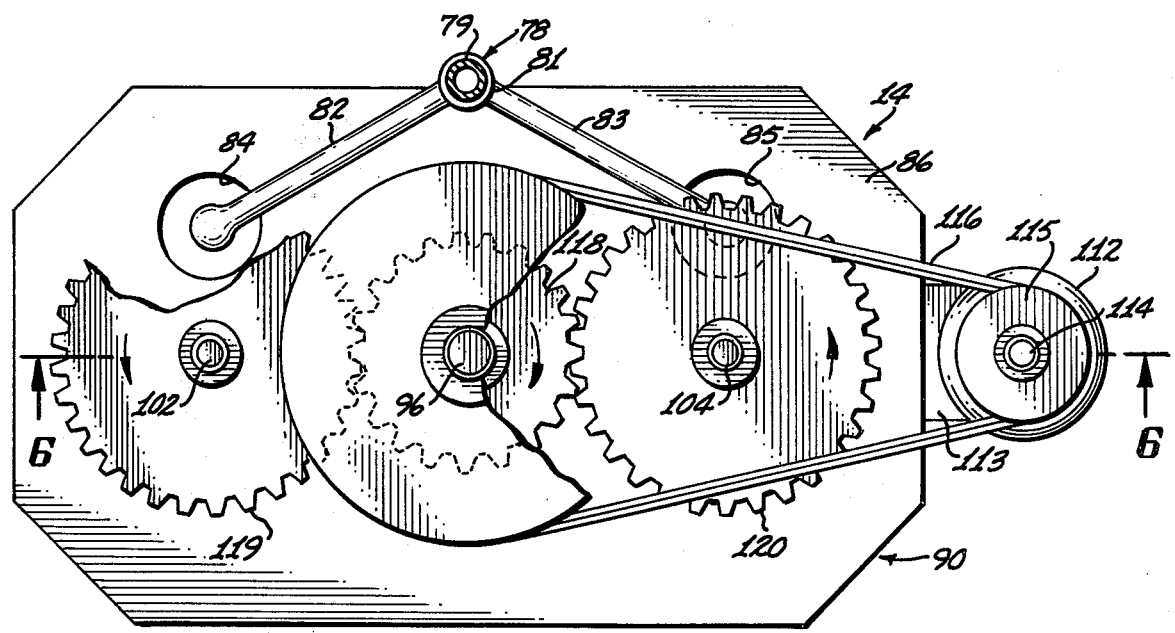
FIG. 5 is a plan view of the centrifugal mill portion of the system of the present invention with portions of that view broken away to illustrate the various features thereof.
Figure 6:
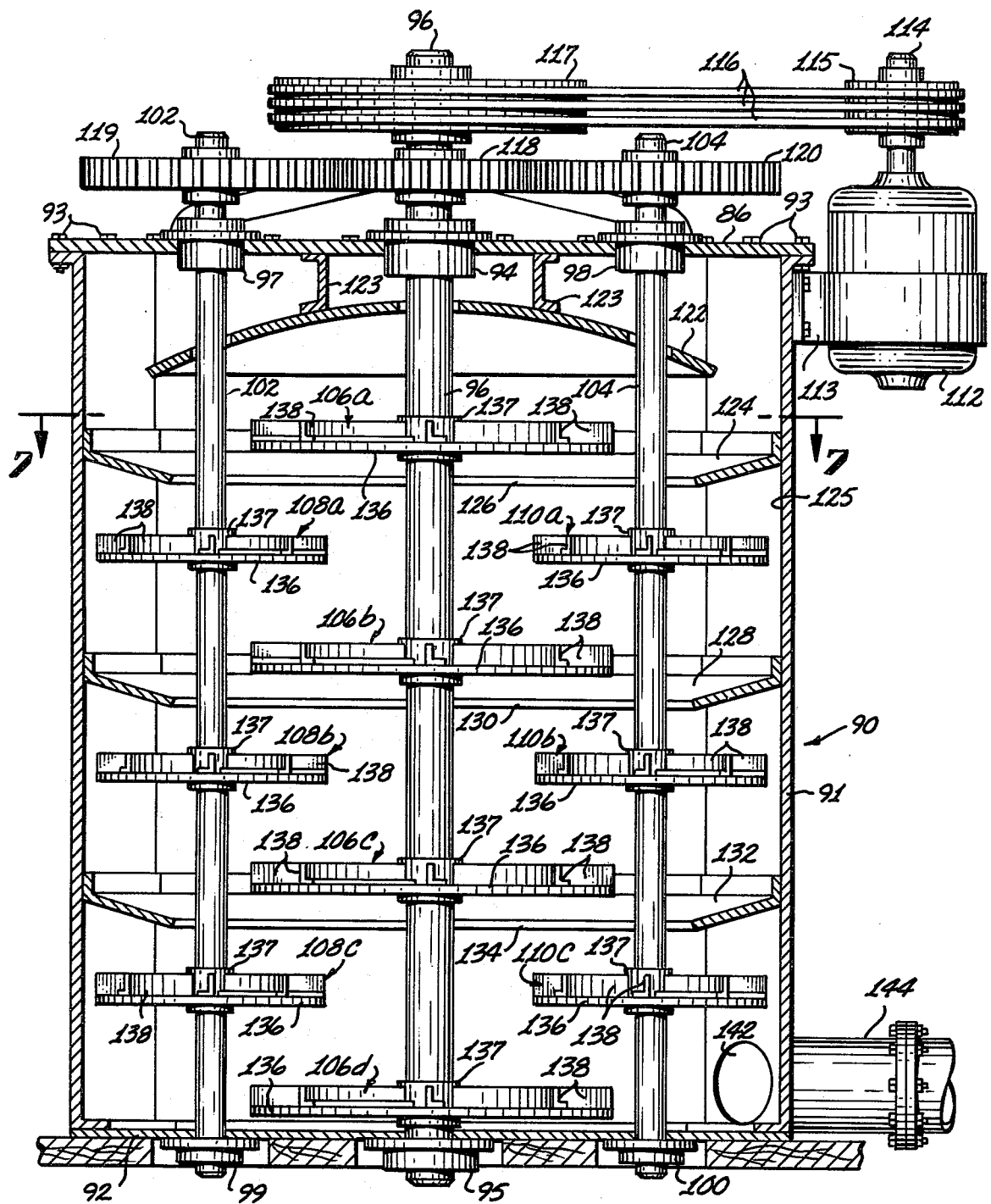
FIG. 6 is a sectional view taken along the line 6—6 of FIG. 5.
Figure 7:
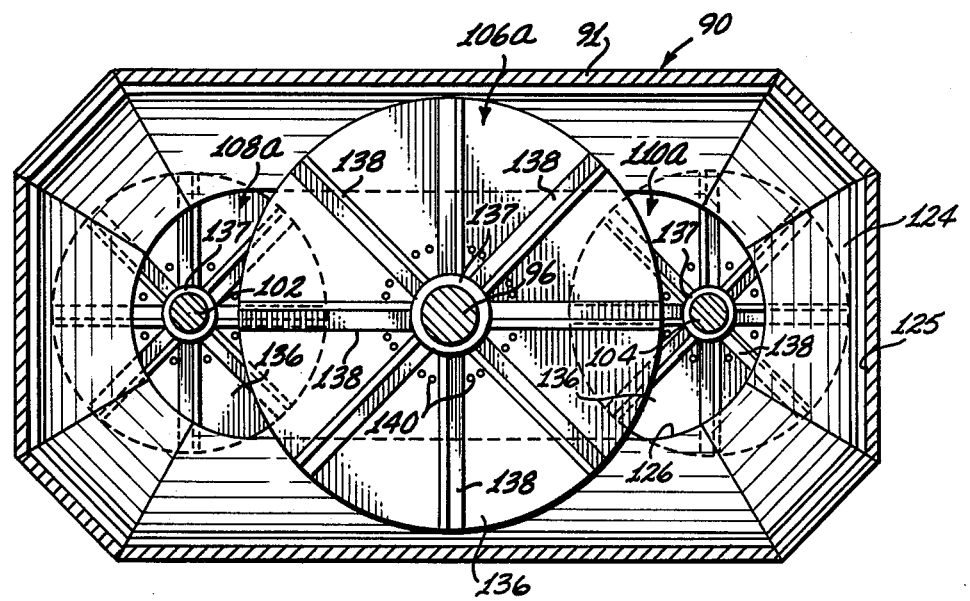
FIG. 7 is a sectional view taken along the line 7—7 of FIG. 6.

Referring particularly to FIGS. 5, 6, and 7, wherein the centrifugal mill 14 is seen to include a housing 90, the endless side wall 91 of which is generally of eliptical configuration and is preferably fabricated of a plurality of flat metal plates suitably interconnected, such as by welding, to form a multi-sided configuration. The multi-sided configuration is preferred for ease of fabrication and to provide ideal air and sewage flow characteristics as will become apparent as this description progresses.

The housing 90 further includes a top or head plate 86, as previously mentioned, and a bottom plate 92, both of which are suitably attached to opposite ends of the endless side wall 91, such as by welding of the bottom plate 92 thereto and demountably attaching the head plate 86 by bolts 93.

The head plate 86 is provided with a centrally located bearing boss 94 and the bottom plate 92 is provided with a similar centrally located bearing boss 95 therein. The bearing bosses 94 and 95 are in vertical alignment with each other and have suitable bearings (not shown) mounted therein for rotatably carrying a central or main shaft 96 in the housing 90.

The head plate 86 is further provided with a laterally spaced pair of bearing bosses 97 and 98 and the bottom plate is provided with a similar laterally spaced pair of bearing bosses 99 and 100 therein. The bearing boss 97 carried in the head plate 86 and the bearing boss 99 carried in the bottom plate 92 are in vertical alignment with each other and are provided with suitable bearings (not shown) for rotatably supporting a first outboard shaft 102 in laterally spaced parallel relationship with respect to the main shaft 96. Likewise, the bearing boss 98 carried in the head plate 86 and the bearing boss 100 carried in the bottom plate 92 are in vertical alignment with each other and have suitable bearings (not shown) for rotatably supporting a second outboard shaft 104 in laterally spaced parallel relationship with respect to the main shaft 96.

As will hereinafter be described in detail, the central or main shaft 96 is provided with a plurality of comminution means 106a, 106b, 106c, and 106d affixed thereon in axially spaced increments, the first outboard shaft 102 is provided with a plurality of comminution means 108a, 108b, and 108c affixed thereon in axially spaced increments, and likewise the second outboard shaft 104 is provided with a plurality of comminution means 110a, 110b, and 110c.

Drive means 112 in the form of a variable speed electric motor is suitably affixed, such as with a bracket 113 to the housing 90 and the output shaft 114 of the motor 112 has a drive pulley 115 mounted thereon. A plurality of belts 116 are employed to couple rotary motion from the drive pulley 115 of the motor 112 to the driven pulley 117 affixed to the upwardly extending end of the central shaft 96. Immediately below the driven pulley 117, intermediate that pulley and the head plate 86 of the housing 90, a drive gear 118 is affixed to the main shaft 96. The first and second outboard shafts 102 and 104 are each provided with a driven gear 119 and 120, respectively, fixedly mounted on their upwardly extending ends and positioned so as to be in diametrically opposed meshed engagement with the drive gear 118 of the central shaft.

As seen best in FIG. 5, the arrangement of the gears 118, 119, and 120 is such that clockwise rotation of the drive gear 118 produces counter clockwise rotation of the driven gears 119 and 120, and the relative sizes of the gears 118, 119, and 120 will result in rotational speeds of the driven gears 119 and 120 being approximately ½ the rotational speed of the drive gear 118. Although the particular rotational speeds of the gears, and thus their respective shafts and comminution means, is not critical, it has been determined that a rotational speed of between 800 and 1800 rpm's is ideal for accomplishing the intended purposes of the system of the present invention, as applied to drive gear 118.

Aqueous raw sewage is supplied to the centrifugal mill 14 from the distribution manifold 78 as described above, through the fixed inlet openings 84 and 85 (FIG. 5) provided in the head plate 86 of the mill. As seen in FIG. 6, the centrifugal mill 14 is provided with a reverse flow checking means 122 which is suspendingly mounted from the head plate 86 such as on suitable braces 123 so as to be interposed between the head plate 86 and the uppermost communition means 106a of the central shaft. The reverse flow checking means 122 is an oval shaped dome plate which is configured to provide an opening between the periphery thereof and the interior of the housing 90, and which deflects the incoming sewage outwardly and downwardly and which prevents undesirable exiting of the aqueous raw sewage through the input ports 84 and 85 such as could result from directly feeding the sewage onto the communition means.

It should be apparent that the above described reverse flow checking means 122 is but one way of accomplishing the desired objective. An alternate apparatus that could be employed is to provide curved standpipes (not shown) extending upwardly and angularly from the intake openings 84 and 85 of the head plate 86.

As seen in FIGS. 6 and 7, the first or uppermost comminution means 106a of the central shaft 96 is located below the reverse flow checking means 122 and a shelf structure 124 is fixed in the bore 125 of the housing 90 approximate the comminution means 106a and is disposed slightly below the path of rotation thereof. The uppermost comminution means 108a of the first outboard shaft 102 and the uppermost comminution means 110a of the second outboard shaft 104 are in horizontal alignment with each other and are spaced below the opening 126 of the shelf structure 124. The next downwardly disposed comminution means 106b of the central shaft 96 is located below the comminution means 108a and 110a of the outboard shafts 102 and 104, respectively, and a shelf structure 128 having a central opening 130 formed therethrough, is fixed in the bore 125 of the housing 90 immediately below the rotational path of the comminution means 106b. The comminution means 108b and 110b of the outboard shafts 102 and 104, respectively, are in horizontal alignment with each other and are below the opening 130 of the shelf structure 128. The next downwardly arranged comminution means 106c of the central shaft 96 is located below the comminution means 108b and 110b of the outboard shafts 102 and 104, respectively, and a shelf structure 132 having a central opening 134 is fixed in the bore 125 of the housing 90 immediately below the rotational path of the comminution means 106c. The comminution means 108c and 110c of the outboard shafts 102 and 104, respectively, are in horizontal alignment with each other and are disposed below the opening 134 of the shelf 132. The lowermost comminution means 106d of the central shaft 96, is located below the comminution means 108c and 110c of the outboard shafts 102 and 104, respectively, and is immediately above the inner surface of the bottom plate 92 of the housing 90.

Since each of the comminution means are identical with the exception that comminution means 106a-d are larger than comminution means 108a-c and 110a-c, it will be understood that the following description of comminution 106a also applies to the other communition means.

As shown in FIGS. 6 and 7, the comminution means 106a comprises a circular disc 136 having a central hub 137 which is suitably affixed to the central or main shaft 96 so that the disc 136 will rotate therewith. A plurality of radially disposed beater vanes 138 are affixed to the upper surface of the disc and are each configured to extend radially from the hub 137 to the periphery of the disc. Each of the beater vanes 138 are fabricated of an angle iron member which is welded or otherwise affixed to the disc 136. The disc 136 is provided with a plurality of apertures 140 proximate the hub 137 thereof to relieve the negative static pressure which would otherwise occur in that area due to rotation of the comminution means 106a.

Although the beater vanes 138 are shown as being affixed to the upper surface of the discs 136 of their respective comminution means 106a-d, 108a-c, and 110a-c, it should be obvious that the vanes 138 could be positioned to depend from the discs or could be alternately disposed so that some of the vanes extend upwardly and others depend.

It will be noted that the comminution means 106a-d, 108a-c, and 110a-c are axially arranged on their respective shafts 96, 102, and 104 so that the different one of the aligned pairs of comminution means 108a-c and 110a-c are disposed between each adjacent pair of comminution means 106a-d. Further, the outboard shafts 102 and 104 are laterally spaced on opposite sides of the central shaft 96 so that the comminution means 106a-d, 108a-c, and 110a-c are disposed in overlapped or interleaved relationships. Thus, the passage of the aqueous raw sewage through the centrifugal mill 14 will be tortuous and as a result of the clockwise rotation of the comminution means 106a-d and counterclockwise rotation of the comminution means 108a-c and 110a-c, the sewage will be subjected to violent turbulence and impact forces.

In addition to the turbulence and impact forces caused by rotation of the comminution means, as described above, large volumes of air will be drawn into the bore 125 of the housing 90 through the inlet ports 84 and 85 formed through the head plate 86. Although only two inlet ports are shown, it should be understood that more of such openings can be provided, and that such supplying of air could be augmented by direct injection of air under pressure from a suitable source (not shown) into the bore 125.

The centrifugal mill 14 will, as described above subject the aqueous raw sewage to violent turbulence and impact forces. Such forces, will, of course, disintegrate the solids contained in the sewage and will rapidly aerate the raw sewage which causes a speed-up in the aerobic bacteria growth so that the sewage emerging from the mill will be odor free due to the biochemical oxygen demand having been satisfied.

The treated aqueous sewage is tangentially discharged from the bottom of the centrifugal mill 14 by rotation of the lowermost comminution means 106d which forces the sewage through a tangential outlet port 142 formed in the side wall 91 of the housing 90. The treated sewage passing through the outlet port 142 passes through suitable pipes 144 to the self cleaning screen means 16.

The self cleaning screen means 16 may be of any of several brands and types of such well known devices which will separate the pulpy solids from the treated sewage. Several models of such a device suitable for this purpose are marketed by the R. P. Adams Co., Inc., 225 E. Park Drive, Buffalo, N.Y. - 14240, and are identified as Adams Poro-Edge Automatic Water Strainers, Model HWS (horizontal mounting) and Model VWS (vertical mounting). Those models are available in capacities ranging from 1500 to 10,000 gallons per minute. Larger capacities to 85,000 gallons per minute are available from the same company, and are identified as Model HDWS.

Other types of similar purpose devices are available from S. P. Kinney Engineers, Inc., P. O. Box 445, Carnegie, Pa., - 15106 and are identified as Kinney Model AV series motorized automatic self cleaning strainers.

Figure 8:
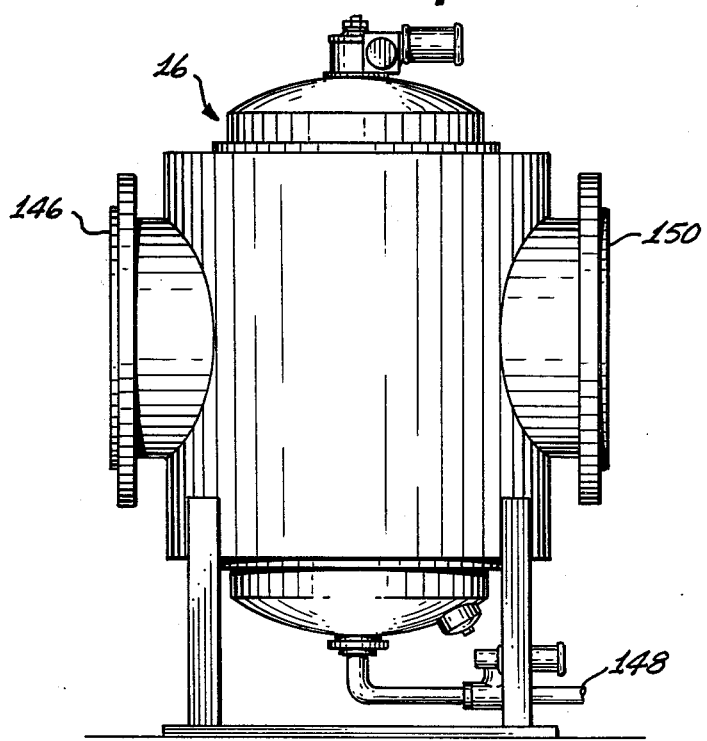
FIG. 8 is a side elevational view of the self cleaning screen means portion of the system of the present invention.

In any event, the self cleaning strainer means 16 as seen best in FIG. 8 has an inlet port 146 for receiving treated sewage from the centrifugal mill 14 as previously described. The treated sewage is processed within the screen means 16 in the well known manner and separated solids emerge from solid outlet ports 148 and the water emerges from the outlet port 150.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What we claim is:

1. A system for treatment of aqueous raw sewage comprising:
   (a) a centrifugal mill having at least one inlet port through which aqueous raw sewage and air are suppliable to the interior of said mill, said centrifugal mill for subjecting the aqueous raw sewage and air to turbulence and impact forces for aeration of aqueous raw sewage and disintegration of the solids therein, said centrifugal mill having an outlet port, said centrifugal mill comprising,
      a) (I) a housing having a vertically disposed bore formed therethrough and a head plate in which the inlet port of said centrifugal mill is formed and a bottom plate adjacent which the outlet port of said centrifugal mill is formed,
      b) (II) a main shaft vertically disposed in the bore of said housing and rotatably mounted therein,
      c) (III) a first plurality of comminution means each affixed to said main shaft for rotation therewith and axially spaced along the length of said main shaft, each of said first plurality of comminution means disposed in a different plane transverse to the longitudinal axis of said main shaft,
      d) (IV) at least one outboard shaft vertically disposed in the bore of said housing and rotatably mounted therein,
      e) (V) a second plurality of comminution means affixed to said outboard shaft for rotation therewith and axially spaced along the length of said outboard shaft, each of said second plurality of comminution means disposed in a different plane transverse to the longitudinal axis of said outboard shaft,
      f) (VI) drive means coupled to said main shaft and to said outboard shaft for rotatably driving those shafts in opposite directions;
   (b) evacuator means connected to the inlet port of said centrifugal mill and connectable to a source of aqueous raw sewage for extracting the sewage from the source and supplying it to the interior of said centrifugal mill through the inlet port thereof; and
   (c) self cleaning screen means connected to the outlet port of said centrifugal mill for separating the disintegrated solids from the aqueous sewage exiting from said centrifugal mill.

2. A system for treatment of aqueous raw sewage as claimed in claim 1 wherein said evacuator means comprises:
   (a) an evacuator tank having an inlet line coupleable to the source of aqueous raw sewage and having an outlet line connected on one end thereof to said evacuator tank;
   (b) a holding tank coupled to the opposite end of the outlet line of said evacuator tank;
   (c) vacuum pump means connected to said evacuator tank and actuatable to draw a vacuum therein to pull aqueous raw sewage into the interior of said evacuator tank when the inlet line thereof is coupled to the source of aqueous raw sewage;
   (d) pressure pump means connected to said evacuator tank and actuatable for pressurization thereof to expel the aqueous raw sewage from the interior of said evacuator tank through the outlet line to said holding tank when said evacuator tank contains aqueous raw sewage; and
   (e) distribution manifold means connected to said holding tank for delivering aqueous raw sewage through the inlet port into the interior of said centrifugal mill when said holding tank contains aqueous raw sewage.

3. A system for treatment of aqueous raw sewage as claimed in claim 2 wherein the inlet line of said evacuator tank is provided with a check valve means to allow the flow of aqueous raw sewage into said evacuator tank when that inlet line is coupled to the source of aqueous raw sewage and to prevent reverse flow thereof.

4. A system for treatment of aqueous raw sewage as claimed in claim 2 wherein the outlet line of said evacuator tank is provided with a check valve means to allow flow of aqueous raw sewage from said evacuator tank to said holding tank when said evacuator tank contains aqueous raw sewage and to prevent reverse flow thereof.

5. A system for treatment of aqueous raw sewage as claimed in claim 2 wherein said distribution manifold means is provided with valve means therein for controlling the flow rate of aqueous raw sewage from said holding tank into said centrifugal mill when said holding tank contains aqueous raw sewage.

6. A system for treatment of aqueous raw sewage as claimed in claim 2 wherein said evacuator means further comprises control means coupled to said evacuator tank, to said vacuum pump means and to said pressure pump means, said control means for sensing the level of aqueous raw sewage in said evacuator tank to actuate said vacuum pump means and deactuate said pressure pump means when said evacuator tank is nearing the empty state, and to actuate said pressure pump and deactuate said vacuum pump means when said evacuator tank is full.

7. A system for treatment of aqueous raw sewage as claimed in claim 2 wherein said evacuator means further comprises:
   (a) sensing means within said evacuator tank for sensing the level of aqueous raw sewage therein for indicating a full state of said evacuator tank and for indicating an empty state of said evacuator tank; and (b) means connecting said sensing means, said pressure pump means and said vacuum pump means for responding to the full state indication of said sensing means by deactivating said vacuum pump means and activating said pressure pump means, and responding to the empty state indication of said sensing means by deactivating said pressure pump means and activating said vacuum pump means.

8. A system for treatment of aqueous raw sewage as claimed in claim 1 wherein said centrifugal mill further comprises reverse flow checking means affixed to the head plate of said housing for admitting aqueous raw sewage to the bore of said housing and preventing reverse flow thereof.

9. A system for treatment of aqueous raw sewage as claimed in claim 1 wherein said centrifugal mill further comprises a plurality of endless shelves each affixed in the bore of said housing and each circumscribing a central opening formed therethrough, each of said plurality of endless shelves disposed adjacent a different one of said first plurality of comminution means so that the central openings thereof are immediately below the rotational path of their respective ones of said first plurality of comminution means.

10. A system for treatment of aqueous raw sewage as claimed in claim 1 wherein said first plurality of comminution means and said second plurality of comminution means are disposed on their respective ones of said main and said outboard shafts so that each of said second plurality of comminution means is disposed between a different adjacent pair of said first plurality of comminution means, and said main and said outboard shafts are spaced with respect to each other so that said first and said second plurality of comminution means are laterally offset in an interleaved relationship.

11. A system for treatment of aqueous raw sewage as claimed in claim 1 wherein said centrifugal mill further comprises reverse flow checking means for admitting aqueous raw sewage into the bore of said housing and preventing reverse flow thereof, said reverse flow checking means comprising a dome shaped plate suspendingly mounted below the head plate of said housing and configured with a periphery which is smaller than the bore of said housing.

12. A system for treatment of aqueous raw sewage as claimed in claim 1 wherein said outboard shaft is coupled to said main shaft by reduction means so that said outboard shaft is driven by said drive means at a rate which is approximately one-half of the rate at which said main shaft is driven.

13. A system for treatment of aqueous raw sewage as claimed in claim 1 wherein each of said first and said second plurality of comminution means comprises:

(a) a flat disc shaped plate;
(b) a central hub affixed to said plate; and
(c) a plurality of beater vanes affixed to said plate and extending radially from said hub.

* * * * *